(12) United States Patent
Kamioka et al.

(10) Patent No.: US 10,006,391 B2
(45) Date of Patent: Jun. 26, 2018

(54) ENGINE START CONTROL DEVICE

(71) Applicant: Mitsubishi Electric Corporation, Tokyo (JP)

(72) Inventors: Nozomu Kamioka, Tokyo (JP); Satoshi Wachi, Tokyo (JP); Toshiaki Date, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 156 days.

(21) Appl. No.: 15/120,634

(22) PCT Filed: Apr. 10, 2014

(86) PCT No.: PCT/JP2014/060414
§ 371 (c)(1),
(2) Date: Aug. 22, 2016

(87) PCT Pub. No.: WO2015/155872
PCT Pub. Date: Oct. 15, 2015

(65) Prior Publication Data
US 2017/0009686 A1 Jan. 12, 2017

(51) Int. Cl.
*B60L 9/00* (2006.01)
*F02D 41/06* (2006.01)
(Continued)

(52) U.S. Cl.
CPC ........... *F02D 41/065* (2013.01); *B60W 10/06* (2013.01); *B60W 30/18018* (2013.01);
(Continued)

(58) Field of Classification Search
CPC ............... F02D 41/0205; F02D 41/062; F02D 41/1497; F02D 11/0814; F02D 41/065; F02D 41/0002; F02D 41/3005; F02D 41/34; F02D 2250/18; F02D 2200/102; F02D 11/0818; F02D 2041/1432; F02D 2200/1004; F02D 2200/101; B60W 30/18018; B60W 10/06;
(Continued)

(56) References Cited

U.S. PATENT DOCUMENTS

| | | | |
|---|---|---|---|
| 8,433,465 B2 * | 4/2013 | Yamazaki | B60K 6/448 701/22 |
| 2004/0123587 A1 * | 7/2004 | Kamiya | F02D 41/0235 60/284 |

(Continued)

FOREIGN PATENT DOCUMENTS

| | | |
|---|---|---|
| JP | 10-331749 A | 12/1998 |
| JP | 2002-213265 A | 7/2002 |

(Continued)

OTHER PUBLICATIONS

International Search Report for PCT/JP2014/060414 dated May 20, 2014 [PCT/ISA/210].

(Continued)

*Primary Examiner* — Hussein Elchanti
(74) *Attorney, Agent, or Firm* — Sughrue Mion, PLLC; Richard C. Turner

(57) ABSTRACT

A start control device for an engine includes an engine control unit, a motor control unit, and a control unit which controls the engine control unit and the motor control unit, wherein the control unit, when transferring an engine restart control mode from a motoring control state to a fuel combustion control state, executes the transfer via a motor/engine combined control state, and sets the timing of transferring from the motoring control state to the motor/engine combined control state, to a timing at which a crank angle of a cylinder where fuel is combusted first after starting fuel injection reaches a crank angle at which it is estimated that torque is generated by the first combustion of fuel in the cylinder.

11 Claims, 18 Drawing Sheets

(51) Int. Cl.
  F02D 41/02    (2006.01)
  F02D 41/14    (2006.01)
  F02N 11/08    (2006.01)
  B60W 10/06    (2006.01)
  B60W 30/18    (2012.01)
  F02D 41/00    (2006.01)
  F02D 41/30    (2006.01)
  F02D 41/34    (2006.01)

(52) U.S. Cl.
  CPC ..... *F02D 41/0002* (2013.01); *F02D 41/0205* (2013.01); *F02D 41/062* (2013.01); *F02D 41/1497* (2013.01); *F02D 41/3005* (2013.01); *F02D 41/34* (2013.01); *F02N 11/0814* (2013.01); *B60W 2510/0638* (2013.01); *B60W 2710/0616* (2013.01); *F02D 2041/1432* (2013.01); *F02D 2200/101* (2013.01); *F02D 2200/1004* (2013.01); *F02D 2250/18* (2013.01); *F02N 11/0818* (2013.01); *F02N 2200/102* (2013.01); *Y02T 10/42* (2013.01); *Y02T 10/44* (2013.01); *Y02T 10/48* (2013.01)

(58) Field of Classification Search
  CPC .. B60W 2710/0616; B60W 2510/0638; Y02T 10/48; Y02T 10/44; Y02T 10/42
  See application file for complete search history.

(56) References Cited

U.S. PATENT DOCUMENTS

| | | | | |
|---|---|---|---|---|
| 2004/0166988 A1* | 8/2004 | Zimmermann | ....... | B60W 10/06 477/71 |
| 2007/0068476 A1* | 3/2007 | Asada | .................. | F02N 11/101 123/179.24 |
| 2009/0182466 A1* | 7/2009 | Watanabe | .............. | B60K 6/105 701/31.4 |
| 2010/0131174 A1* | 5/2010 | Wiggins | .................. | F02D 13/02 701/103 |
| 2012/0083952 A1 | 4/2012 | Smith et al. | | |
| 2012/0318235 A1* | 12/2012 | Kaiser | .................. | F02D 11/105 123/350 |
| 2013/0096750 A1* | 4/2013 | Kim | ........................ | B60K 6/24 701/22 |
| 2013/0325227 A1* | 12/2013 | Whitney | ............... | B60W 10/06 701/22 |
| 2014/0074333 A1* | 3/2014 | Ohkuma | ................ | B60K 6/445 701/22 |
| 2014/0121871 A1* | 5/2014 | Kim | ...................... | B60K 6/442 701/22 |
| 2015/0166043 A1* | 6/2015 | Watanabe | ................ | B60K 6/48 701/22 |

FOREIGN PATENT DOCUMENTS

| | | |
|---|---|---|
| JP | 2009-208686 A | 9/2009 |
| JP | 2011-005957 A | 1/2011 |
| JP | 5040834 B2 | 10/2012 |
| WO | 2010/150081 A2 | 12/2010 |

OTHER PUBLICATIONS

Written Opinion for PCT/JP2014/060414 dated May 20, 2014 [PCT/ISA/237].

* cited by examiner

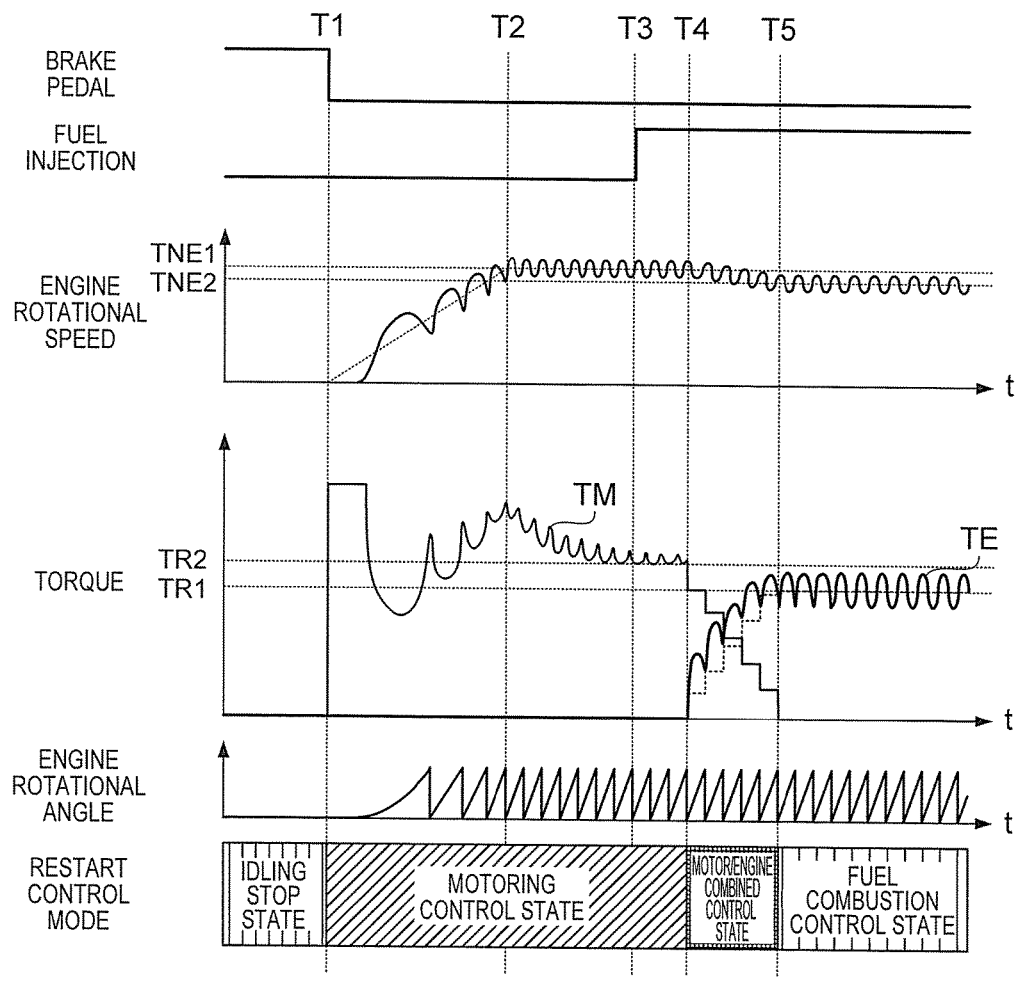

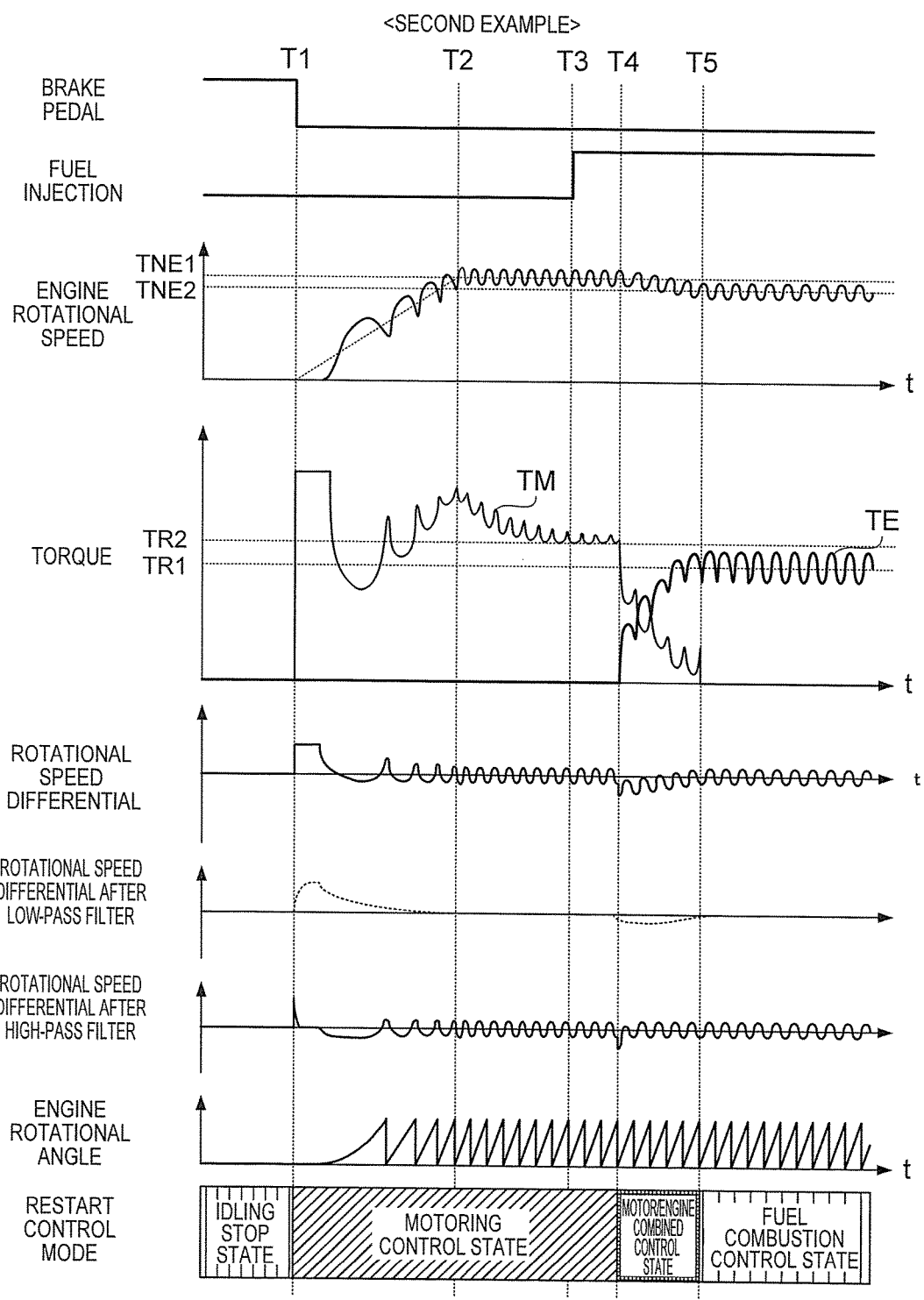

<FIRST EXAMPLE>

<SECOND EXAMPLE>

<THIRD EXAMPLE>

<FIRST EXAMPLE>

<SECOND EXAMPLE>

<THIRD EXAMPLE>

US 10,006,391 B2

ENGINE START CONTROL DEVICE

CROSS REFERENCE TO RELATED APPLICATIONS

This application is a National Stage of International Application No. PCT/JP2014/060414 filed Apr. 10, 2014, the contents of all of which are incorporated herein by reference in their entirety.

TECHNICAL FIELD

This invention relates to an engine start control device, and more particularly to an engine start control device for a vehicle provided with an idling stop function.

BACKGROUND ART

A vehicle with an idling stop function stops the supply of fuel to the engine, when predetermined idling stop conditions are satisfied. Therefore, the engine stalls when the rotational speed of the engine decreases. Subsequently, a motor directly coupled to the engine shaft is triggered to start rotation when the brake pedal is released, for instance, and the engine enters a restart state in which the rotational speed of the engine rises. Then, when predetermined conditions are satisfied, fuel injection is restarted, and furthermore driving of the motor is stopped and the vehicle transfers to a state where the engine rotates due to energy from fuel combustion only. When in an engine restart state, the torque transmitted to the vehicle is controlled by the motor drive force and the energy from fuel combustion. However, if this controllability declines, there is a problem in that racing of the engine and variation in the torque transmitted to the tires occurs, and the feeling for the driver becomes worse.

The difficulty in this problem is that even if the torque of the motor is continuous, the torque output of the engine is intermittent, and the output torque also fluctuates greatly depending on the state of combustion. Consequently, the torque due to combustion which starts up suddenly must be detected, and furthermore, the torque transmitted to the vehicle must be controlled precisely by reducing the torque of the motor, in accordance with magnitude of the torque.

However, in order to control the torque precisely, it is suitable to detect the torque directly. Desirably, it is necessary to detect the torque due to combustion in the engine which displays great fluctuation in the output torque. Therefore, the internal pressure of the cylinders is detected by using a sensor for detecting the internal pressure of the cylinders of the engine, for example, and the engine torque is detected by converting the detected internal pressure of the cylinders into the engine torque. Alternatively, a torque sensor for detecting the engine axle torque is installed in the torque transmission path from the engine to the tires so as to detect the engine torque. Therefore, a sensor of this kind is required, and there is a problem in that the cost of the vehicle rises as a consequence.

Various methods for resolving these problems have been proposed, in which the torque of the engine and motor is controlled without detecting the torque of engine and motor.

For example, in the starting device for an engine disclosed in PTL 1, when the engine is started up, motoring start control is carried out to raise the rotational speed of the engine by motoring, whereupon fuel injection start control is carried out to raise the rotational speed of the engine by torque from the combustion of fuel. In PTL 1, precise control of the torque is not required, since no time period is provided for controlling the torque transmitted to the vehicle.

For example, in the starting device for an engine disclosed in PTL 2, in the time period for controlling the torque transmitted to the vehicle by the drive force of the motor and energy from combustion of fuel, the motor is subjected to rotational speed feedback control based on the differential between a predetermined target rotational speed and the current rotational speed, thereby suppressing variation in the rotational speed of the engine due to increase in the torque from combustion of fuel.

CITATION LIST

Patent Literature

[PTL 1]
Japanese Patent No. 5040834 (FIG. 4)
[PTL 2]
Japanese Patent Application Publication No. H10-331749 (FIG. 19)

SUMMARY OF INVENTION

Technical Problem

The engine start control device according to PTL 1 is configured so as to be switched from a state which raises the rotational speed of the engine by the drive power of the motor alone, without injecting fuel, to a state which raises the rotational speed of the engine by energy from combustion of fuel, without driving the motor. With this method, there is also a problem of the engine stalling, when the engine does not ignite, contrary to intentions, despite the fact that fuel is injected and an ignition operation is performed.

Furthermore, in the conventional engine start control device according to PTL 2, a time period for controlling the torque transmitted to the vehicle by the drive power of the motor and energy from combustion of fuel is provided. Consequently, even in cases where the engine does not ignite, contrary to intentions, which is the problem in PTL 1, it is possible to compensate for the insufficient torque with the drive power of the motor. However, the control is constructed by detecting the torque from combustion of fuel and using the detection value. Therefore, since delay of one control cycle occurs after detection, then the controllability declines. As a result of this, there is a problem in that racing of the engine revolutions cannot be suppressed entirely, for example.

The present invention was devised in order to resolve these problems, an object thereof being to provide an engine start control device capable of suppressing variation in the torque transmitted to the vehicle and/or variation in the rotational speed, without giving rise to control delays, even if there is a time period for controlling the torque transmitted to the vehicle by the drive power of a motor and the energy from combustion of fuel, when restarting an engine.

Solution to Problem

This invention is an engine start control device mounted in a vehicle, the vehicle having an engine, a motor which causes the engine to rotate, and tires which rotate due to motive power from at least one of the engine and the motor, the engine start control device including: an engine control unit which controls the output of the engine by adjusting at least one of an intake air amount and a fuel injection amount of the engine; a motor control unit which controls the output of the motor; and a control unit which controls the engine control unit and the motor control unit, wherein the control unit has, as restart control modes of the engine: a motoring control state which causes the engine to rotate only by drive power of the motor; a fuel combustion control state which causes the engine to rotate only by drive power from combustion of fuel in the engine; and a motor/engine combined control state which causes the engine to rotate by both the drive power of the motor and the drive power from combustion of fuel in the engine, and the control unit: when transferring the restart control mode of the engine from the motoring control state to the fuel combustion control state, executes the transfer via the motor/engine combined control state; and sets a timing of transferring from the motoring control state to the motor/engine combined control state, to a timing at which a crank angle of a cylinder where fuel is combusted first after starting injection of the fuel reaches a crank angle at which it is estimated that torque is generated by the first combustion of fuel in the cylinder.

Advantageous Effects of Invention

According to this invention, since the torque of the motor is reduced at the timing at which the fuel is combusted first after starting fuel injection, then it is possible to control the torque applied to the whole vehicle with good response, compared to when the torque of the motor is controlled after detecting the generation of torque by the engine, and therefore when restarting the engine, it is possible to suppress variation in the torque transmitted to the vehicle, or the rotational speed, without the occurrence of any control delays, even if there is a time period for controlling the torque transmitted to the vehicle by drive power from the motor and energy from the combustion of fuel.

BRIEF DESCRIPTION OF DRAWINGS

FIG. 2 is a timing chart representing the operation of an engine start control device according to a first example of the first embodiment.

FIG. 3 is a timing chart representing the operation of an engine start control device according to a second example of the first embodiment.

DESCRIPTION OF EMBODIMENTS

Figure 1A:
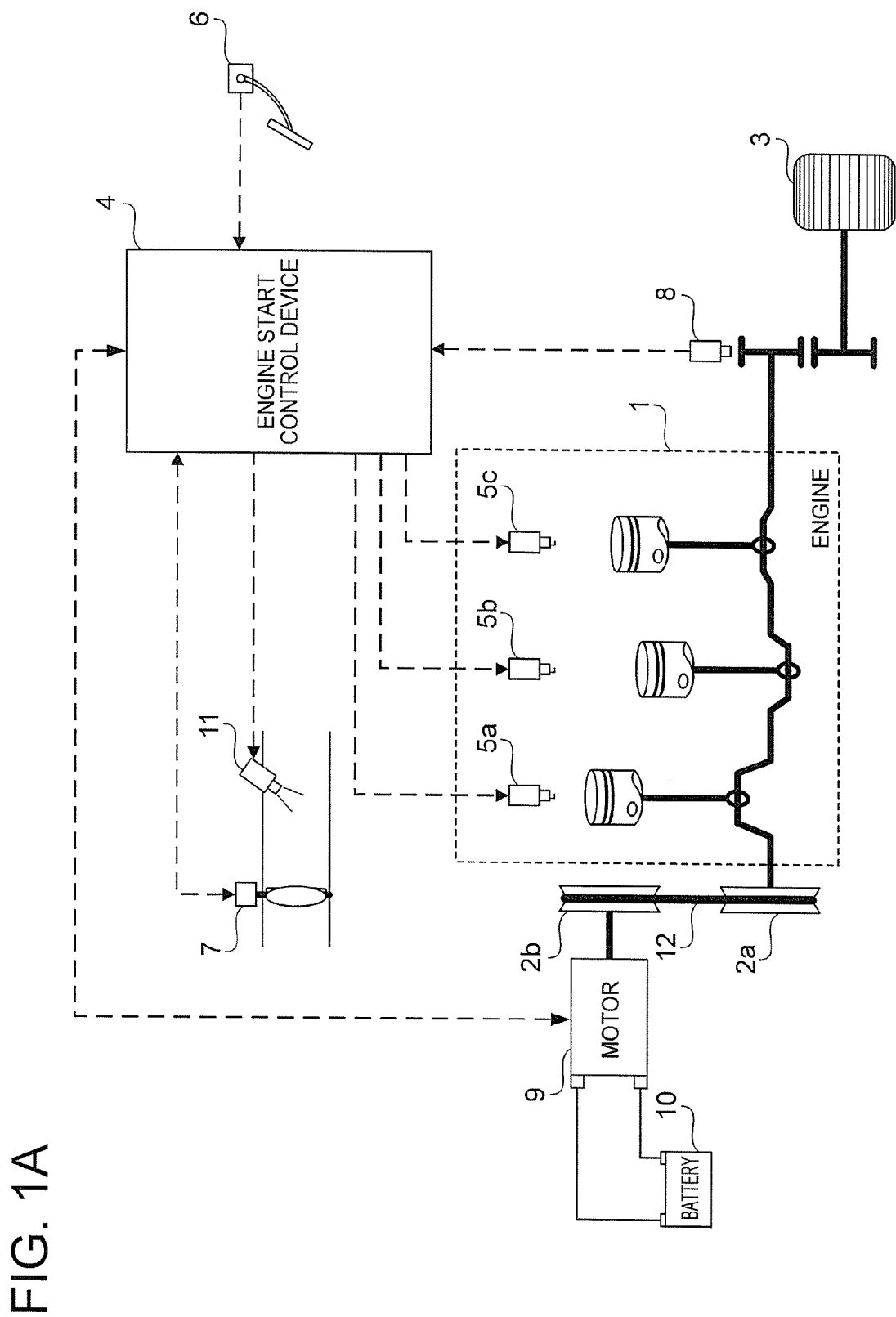
FIG. 1A is a diagram showing the configuration of an engine start control device according to a first embodiment of the invention, and the periphery thereof.

This invention is an engine start control device mounted in a vehicle, the vehicle having an engine, a motor which turns the engine, and tires which rotate due to motive power of at least one of the engine and the motor. The engine start control device includes an engine control unit which controls the output of the engine by adjusting at least one of the intake air amount and the fuel injection amount of the engine, a motor control unit which controls the output of the motor, and a control unit which controls the engine control unit and the motor control unit. The control unit is provided with the following restart control modes for the engine: a motoring control state which causes the engine to rotate only by drive power of the motor; a fuel combustion control state which causes the engine to rotate only by drive power from combustion of fuel in the engine; and a motor/engine combined control state which causes the engine to rotate by both the drive power of the motor and the drive power from combustion of fuel in the engine. The control unit, when transferring the restart control mode of the engine from the motoring control state to the fuel combustion control state, executes the transfer via the motor/engine combined control state, and sets a timing of transferring from the motoring control state to the motor/engine combined control state, to a timing at which a crank angle of a cylinder where fuel is combusted first after starting the fuel injection reaches a crank angle at which it is estimated that torque is generated by the first combustion of fuel in the cylinder.

Consequently, since the torque of the motor can be decreased in accordance with timing at which the initial explosion occurs, it is possible to control the torque applied to the whole vehicle, with good response, compared to a case where the torque of the motor is controlled after detecting the generation of torque by the engine, and consequently, racing of the engine revolutions can be suppressed. Therefore, it is possible to suppress variation in the torque transmitted to the vehicle and/or the rotational speed, without the occurrence of control delays.

Furthermore, the motor/engine combined control state is a control state including: engine control in which the engine control unit performs rotational speed feedback control based on a predetermined target rotational speed and a current rotational speed; and motor control in which the motor control unit controls the motor so as to progressively reduce motor torque by a predetermined torque reduction amount. A feedback system is constructed using two operation amounts, namely the torque for the engine and for the motor, in relation to one control object, which is the rotational speed of the engine, and although the rotational speed is liable to oscillate, by adopting the configuration indicated above, it is possible to control the rotational speed of the engine stably without oscillations.

Furthermore, the motor/engine combined control state is a control state including: engine control in which the engine control unit performs rotational speed feedback control based on a rotational speed differential between a target rotational speed and a current rotational speed of the engine; and motor control in which the motor control unit performs rotational speed feedback control based on the rotational speed differential of the engine. Therefore, even if a rotational speed feedback control system which would produce oscillations in the prior art is constructed, since the feedback is based on two operation amounts relating to the engine and the motor, which have different response characteristics, then it is possible to minimize the error with respect to the target rotational speed.

Furthermore, a control system is constructed such that, in the motor/engine combined control state, the control unit calculates the rotational speed differential between the target rotational speed and the current rotational speed of the engine, applies a low-pass filter and a high-pass filter to the rotational speed differential, sets the rotational speed differential after the low-pass filter as the rotational speed differential for the rotational speed feedback control in the engine control unit, and sets the rotational speed differential after the high-pass filter as the rotational speed differential in the motor control unit. Consequently, rotational variations which occur at multiple points during the temporal variation of the rotational speed of the engine are controlled by a torque obtained as a result of rotational speed feedback control using the engine and the motor, which have different response characteristics, and furthermore, rotational variations in the engine can be reduced more effectively by feeding back the operation amounts separately by frequency.

Furthermore, the cut-off frequency of the low-pass filter and the cut-off frequency of the high-pass filter are switched on the basis of the current rotational speed of the engine. Therefore, even if the rotational speed of the engine increases, and the intake air amount increases and the response of the engine improves, it is still possible to effectively reduce rotational variations in the engine.

Furthermore, in the motor/engine combined control state, the control unit calculates the rotational speed differential between the target rotational speed and the current rotational speed of the engine, and distributes the target torque based on the rotational speed differential to the engine and the motor respectively at a predetermined ratio. Therefore, by gradually increasing the ratio of the engine torque in the rotational speed feedback control system and gradually decreasing the ratio of the motor torque, it is possible to carry out a smooth transfer of torque from the motor to the engine, and variation in the rotational speed of the torque and engine can be suppressed.

Moreover, the predetermined ratio is previously determined such that the sum of the ratio for the engine and the ratio for the motor is 100%, and the ratio for the motor takes a maximum value immediately after transfer to the motor/engine combined control state, and subsequently decreases in steps at a predetermined rate, each time the cylinder where combustion of fuel occurs in the engine switches from one cylinder to the next cylinder. Consequently, since the motor torque is reduced in accordance with the engine torque which varies with the cycle between cylinders, then it is possible to reduce the effects of the engine torque on the ride of the vehicle.

Furthermore, in the motor/engine combined control state, the control unit calculates, as estimated torque, torque required by the vehicle in the fuel combustion control state, and sets an initial value of a torque command value instructed to the motor immediately before transfer to the motor/engine combined control state to a value that is greater than the estimated torque. Therefore, even if the engine accidentally misfires, and the expected engine torque is not output, this shortfall is compensated for by the motor torque, so rotation continues and the engine can be prevented from stalling. Moreover, it is also possible to achieve good control response compared to a case there control is carried out after detecting an accidental misfiring state of the engine.

Furthermore, the engine and the motor are configured so as to be capable of transmitting motive power mutually to the vehicle, and are configured such that a constant rotational speed ratio relationship is established at all times between a rotational speed of the motor and a rotational speed of the engine. Therefore, since control of the gear ratio is not required, in comparison with a case where the rotational ratio between the engine and the motor is not constant, it is possible to implement rotational speed feedback control, and torque control, accurately by a simple configuration.

Furthermore, a transfer determination condition for transferring from the motor/engine combined control state to the fuel combustion control state is that the ratio of target torque of the motor to a target torque sum value obtained by adding target torque of the engine and the target torque of the motor is less than a predetermined first threshold value. Consequently, since the driving of the motor is stopped when the ratio of the motor torque in the whole torque causing the vehicle to travel is at a level which does not degrade the riding feel, it is possible to shorten the drive time of the motor, and to suppress wasteful consumption of electric power, compared to a case where the determination described above is not made.

Furthermore, the transfer determination condition for transferring from the motor/engine combined control state to the fuel combustion control state is that the target torque of the motor is less than a predetermined second threshold value. Therefore, it is possible to halt the driving of the motor by a simple and clear determination, and therefore the processing load on the device can be reduced.

The engine start control device according to the present invention is described below on the basis of embodiments with reference to the drawings. Portions which are the same or equivalent in the drawings are indicated by the same reference numerals and repeated description thereof is omitted here.

First Embodiment

Figure 1B:
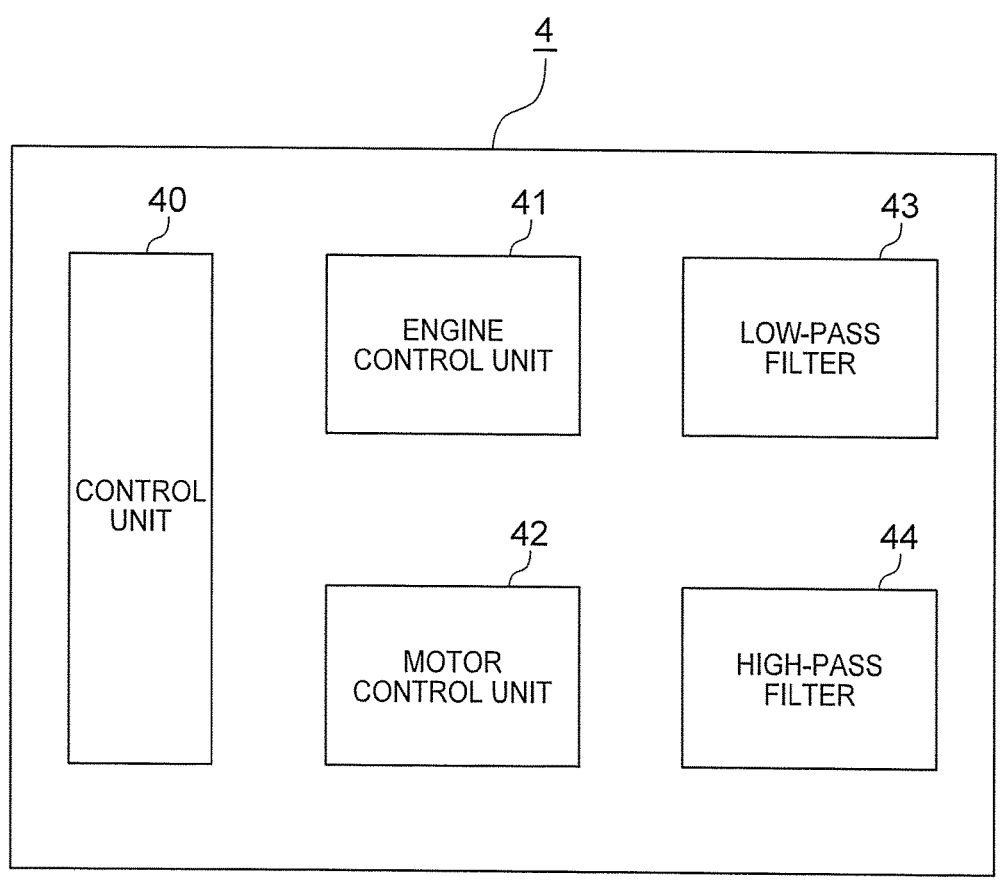
FIG. 1B is a diagram showing the internal configuration of the engine start control device according to the first embodiment of the invention.

FIG. 1A is a diagram showing the configuration of an engine start control device 4 according to a first embodiment of the invention, and a vehicle on which this device is mounted. Furthermore, FIG. 1B is a diagram showing an internal configuration of the engine start control device 4.

As shown in FIG. 1A, the vehicle is provided with an engine 1, pulleys 2a, 2b, tires 3, spark plugs 5a, 5b, 5c provided for each cylinder of the engine 1, a brake pedal sensor 6 provided on a brake pedal, a throttle valve 7 (intake air amount adjustment device) which adjusts the amount of intake air, a rotational angle detector 8 which detects the rotational angle of the engine 1, a motor 9 which is a starting device for the engine 1, a battery 10 which is provided in the motor 9, an injector 11 (fuel injection device) which injects fuel, and a loop-shaped belt 12 which is wrapped about the pulleys 2a, 2b. Although only one tire 3 is depicted in FIG. 1A, in actual practice a plurality of tires 3 are provided.

The engine start control device 4 according to the first embodiment is mounted in the vehicle and controls the starting of the engine 1.

The rotational force of the engine 1 is transmitted to the tires 3 via a transmission gear. A rotational angle detector 8 is provided in the engine 1. The rotational angle detector 8 detects the angle of rotation of the engine 1 and transmits the angle of rotation to the engine start control device 4. The engine start control device 4 calculates the rotational speed of the engine 1 by differentiation of the received angle of rotation.

As shown in FIG. 1B, the engine start control device 4 is provided with an engine control unit 41 which controls the engine 1, a motor control unit 42 which controls the motor 9, and a control unit 40 which controls the engine control unit 41 and the motor control unit 42. Furthermore, the engine start control device 4 may be provided with a low-pass filter 43 and a high-pass filter 44 for use in feedback control, as necessary. Even in this case, it is not particularly necessary to provide both the low-pass filter 43 and the high-pass filter 44, for example, it is also possible to provide only the low-pass filter 43 and to determine the results of the filtering process of the high-pass filter 44 by calculation, using the results of the filtering process of the low-pass filter 43.

The engine control unit 41 receives the target torque of the engine 1 from the control unit 40 and controls the output of the engine 1, by controlling at least one of the intake air amount of the throttle valve 7, the fuel injection amount of the injector 11, and the ignition timing of the spark plug 5, on the basis of the rotational angle or rotational speed of the engine 1, so as to achieve the target torque.

Furthermore, the control unit 40 calculates a target rotational speed of the engine 1 in accordance with predetermined conditions. The control unit 40 also has a rotational speed feedback function, and when performing rotational feedback control, calculates a target torque on the basis of the calculated target rotational speed and the rotational speed of the engine 1, and instructs the engine control unit 41 to control the engine 1 to that target torque. Moreover, when predetermined idling stop conditions are satisfied, the control unit 40 instructs the engine control unit 41 to stop injection of fuel by the injector 11, and stops the engine 1 by instructing the spark plugs 5 to stop ignition. Thereupon, when predetermined restart conditions and fuel injection restart conditions are satisfied, the control unit 40 instructs the engine control unit 41 to inject fuel from the injector 11, in order to start the engine 1, and also instructs ignition by the spark plugs 5.

The motor 9 is connected to the engine 1. The motor 9 is a device for starting the engine 1. The output shaft of the motor 9 is coupled to the engine 1 via the belt 12 and pulleys 2a, 2b. More specifically, the output shaft of the motor 9 is coupled to the pulley 2b. Furthermore, the pulley 2a is coupled to the crankshaft of the engine 1. In this case, since one belt 12 is wound commonly about the pulley 2a and the pulley 2b, then when the pulley 2b rotates due to the motor 9, the pulley 2a also rotates in synchronism therewith and this rotation is transmitted to the crankshaft of the engine 1. Furthermore, a rotation sensor (not illustrated) is provided inside the motor 9, whereby the rotational speed of the motor 9 can be detected.

The motor control unit 42 controls the driving and stopping of the motor 9 on the basis of a command from the control unit 40. The motor control unit 42 receives instruction of a target torque of the motor 9, from the control unit 40, and drives the motor 9 on the basis of the target torque. The control unit 40 determines whether or not a restart is necessary on the basis of a signal from the brake pedal sensor 6, and if predetermined restart conditions have been satisfied, instructs the motor control unit 42 to drive the motor 9. The brake pedal sensor 6 detects the presence or absence of pressing of the brake pedal, or the amount of depression of the brake pedal. Examples of the restart conditions are, for instance, when depression of the brake pedal by the driver has been released, or when the amount of depression of the brake pedal is less than a predetermined fixed amount.

The control unit 40 calculates the target torque of the motor 9 on the basis of the rotational angle of the engine 1. More specifically, the control unit 40 decreases the target torque of the motor 9 in a stepped fashion sequentially at a predetermined rate, at a timing at which the cylinder is switched from one cylinder where combustion occurs first in the engine 1, to the cylinder where combustion occurs next. Therefore, the target torque of the motor 9 progressively decreases in steps, in predetermined decrements (called "first decrements" below).

Furthermore, the control unit 40 also has a rotational speed feedback function, and calculates a target torque of the motor 9 on the basis of the difference between the target rotational speed and the actual rotational speed of the engine 1, and instructs the target torque of the motor 9 to the motor control unit 42.

Alternatively, the control unit 40 calculates a target rotational speed for the motor 9 in accordance with predetermined conditions. The control unit 40 calculates the target torque on the basis of the difference between the calculated target rotational speed and the rotational speed of the motor 9, and instructs the target torque of the motor 9 to the motor control unit 42 in the rotational speed feedback control.

Furthermore, the control unit 40 estimates the torque required for starting, determines a ratio for distribution of the estimated torque on the basis of predetermined conditions and a calculation formula, and distributes the estimated torque respectively to the engine 1 and the motor 9 on the basis of this ratio. In the engine start control device 4, the engine control unit 41 and the motor control unit 42 are able to share the information in a mutually collaborative fashion.

Furthermore, the motor 9 is provided with a battery 10. The battery 10 is charged by receiving a supply of electric power from a generator (not illustrated), and also supplies electric power to the motor 9. Moreover, the battery 10 supplies power to load apparatuses (electric apparatuses) of the vehicle that are not illustrated, as well as to the engine start control device 4.

Since the motor 9 and the engine 1 rotate in synchronism, then the speed of the vehicle (vehicle speed), which is the speed of rotation of the tires 3, can be determined from the speed of rotation of the engine 1 as calculated inside the engine start control device 4.

The vehicle speed, the rotational speed of the engine 1 and the rotational speed of the motor 9 may be detected by other types of detector that are not illustrated, and are not limited to the detection methods described above, and may also be determined on the basis of a predetermined calculation from the detection values of other detectors. Furthermore, these values may also be acquired from existing information used for normal engine control inside the engine start control device 4, or by calculation or the like from the information.

Moreover, in the embodiment in FIG. 1, the engine 1 is described by using a three-cylinder engine, but there is no effect on the control even if the number of cylinders is different.

Figure 4:
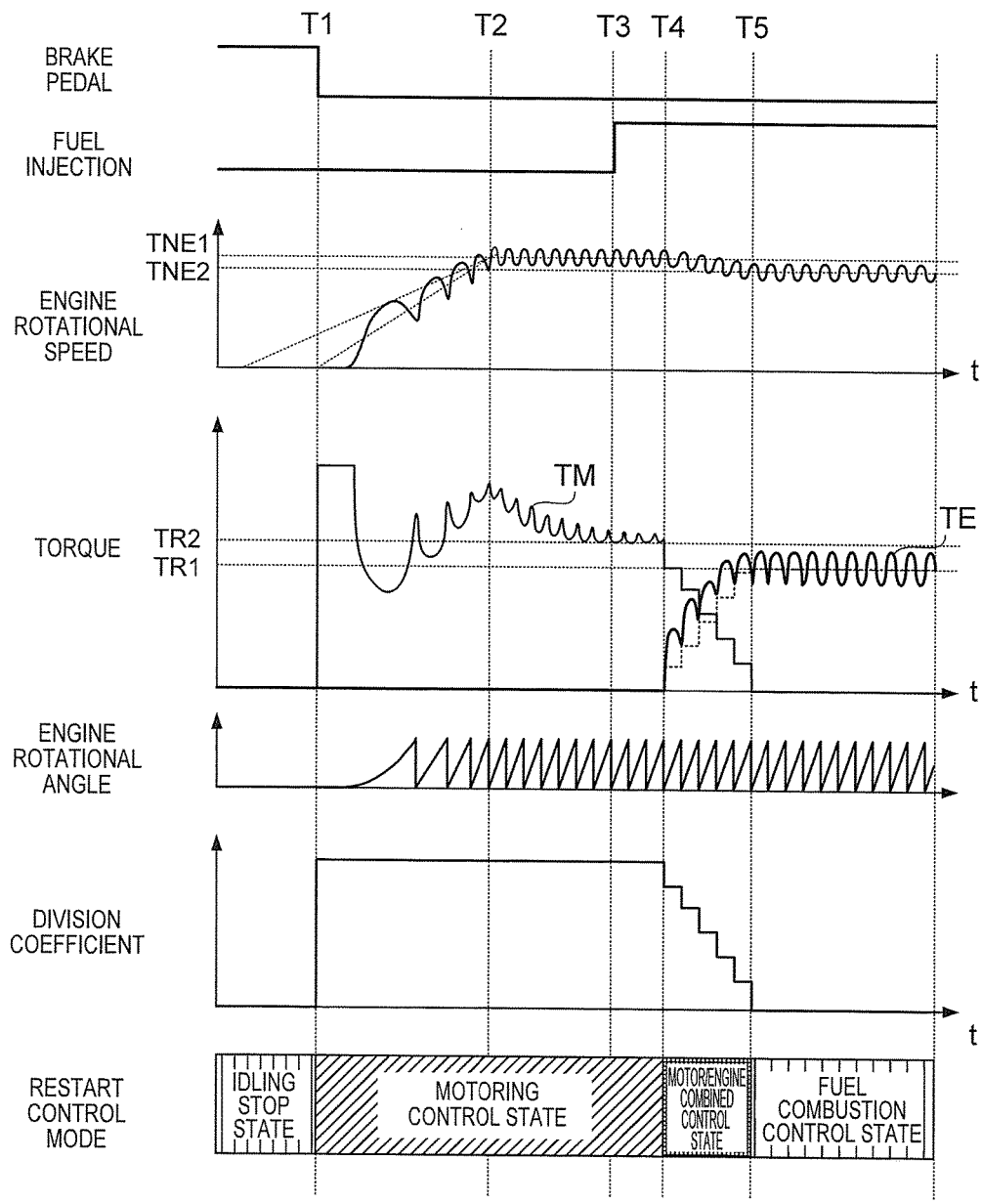
FIG. 4 is a timing chart representing the operation of an engine start control device according to a third example of the first embodiment.

Next, the operation when starting the engine 1 using the start control method of the engine start control device 4 according to the first embodiment will be described. The start control method according to the first embodiment includes the three types of method illustrated in FIG. 2, FIG. 3 and FIG. 4. The start control methods illustrated in FIG. 2, FIG. 3 and FIG. 4 are respectively called a first example, a second example and a third example.

Firstly, the first example illustrated in FIG. 2 is described. FIG. 2 is a timing chart indicating the operations of the respective parts of the engine start control device in FIG. 1. In FIG. 2, the horizontal axis represents the time and the lateral axis represents changes in respective factors. The factors include: the brake pedal, fuel injection, engine rotational speed, torque, engine rotational angle, restart control mode.

The restart control mode has the following four states.
(1) Idling stop state
(2) Motoring control state which causes the engine 1 to rotate only by the drive power of the motor 9
(3) Motor/engine combined control state which causes the engine 1 to rotate by both the drive power of the motor 9 and the drive power from the combustion of fuel in the engine 1
(4) Fuel combustion control state which causes the engine 1 to rotate only by drive power from combustion of fuel in the engine 1

Here, the "restart condition" is described as "release of the depression of the brake pedal during an idling stop (called "brake pedal release" below)". Furthermore, here, the "fuel injection restart conditions" are described as "elapsing of a predetermined time from the release of the brake pedal". Furthermore, in FIG. 2, the rotational angle of the engine 1 is indicated as a value from zero degrees to a predetermined angle, but this predetermined angle represents an angle range in the explosion interval of one cylinder. The rotational speed of the engine 1 is determined by differential calculation from the rotational angle of the engine 1 obtained by the rotational angle detector 8. In FIG. 2, TM represents the calculated torque of the motor 9 and TE represents the torque of the engine 1. Furthermore, the dotted line represents the target torque and the solid line represents the actual torque. Since the motor 9 can be controlled with good response, the actual torque coincides substantially with the target torque, and therefore is depicted in superimposed fashion. In order to simplify the description, the ratio between the outer diameters of the pulleys 2a and 2b which are interposed between the motor 9 and the engine 1 is taken to be the same.

In FIG. 2, in an initial state at time t=0, the brake pedal is depressed in the vehicle and the vehicle is in a stationary state. The restart control mode is an idling stop state. The engine start control device 4 instructs the injector 11 to stop fuel injection. Therefore, fuel is not injected. Furthermore, the engine start control device 4 instructs the ignition plug 5 to stop driving, and no spark occurs. The engine 1 stops at any rotational angle (the rotational angle where the engine stops naturally), and the rotational speed of the engine becomes zero. Furthermore, the target rotational speed of the engine as calculated by the engine start control device 4 is set to zero.

At time t=T1, the drier releases the brake pedal. The engine start control device 4 detects the releasing of the brake pedal by the brake pedal sensor 6, and sets the restart control mode to the motoring control state. In the motoring control state, rotational speed feedback control based on the drive power of the motor 9 is carried out. The target rotational speed of the engine is increased in direct proportion to the elapsed time, by a predetermined target engine rotational speed increment [r/min/sec] which is set in the engine start control device 4. The target torque of the motor 9 has a large value when rotation is stopped, and after the engine 1 has started to rotate, has a value corresponding to rotational speed feedback control.

At time t=T2, the rotational speed of the engine 1 reaches TNE1. TNE1 is the upper limit value relating to a predetermined first target engine rotational speed set in the engine start control device 4. The engine 1 operates so as to maintain a constant rotational speed of the engine, and therefore torque consumed by inertia is not necessary and the average value of the target torque of the motor 9 is TR2.

At time t=T3, since the predetermined time period has elapsed after the release of the brake pedal, then the "fuel injection restart condition" is satisfied. Accordingly, the engine start control device 4 instructs the injector 11 to restart fuel injection. In this way, fuel is injected from the injector 11 into the cylinder which is in the intake phase. Normally, after the intake phase and the compression phase, the engine 1 transfers to an expansion phase in which the fuel is caused to combust by a spark plug 5, and therefore no torque is generated in the engine 1 at this time.

Time t=T4 represents a timing at which the cylinder into which fuel has been injected at time t=T3 enters the expansion phase and the engine 1 generates torque. In this case, the restart control mode is set to the motor/engine combined control state, by the engine start control device 4. The timing t=T4 at which the engine start control device 4 is set to the motor/engine combined control state is the timing at which the crank angle of the cylinder where fuel is combusted first after the restart of fuel injection reaches a predetermined crank angle at which it is estimated that torque is generated by the first combustion of fuel in the cylinder. The target torque of the motor 9 is changed to TR1. The target torque TR1 is a lower value than the average value TR2 of the motor torque until transferring from the motoring control state to the motor/engine combined control state. The target torque TR1 is stored previously in the engine start control device 4. The value of the target torque TR1 is set so as to decrease in stepped fashion, successively, in predetermined decrements (called "first decrements" below), as the cylinder switches from the cylinder where combustion occurs first in the engine 1, to the cylinder where combustion occurs next, as indicated by time T4 to T5 in FIG. 2. This first decrements are determined by the value of TR1-TR2. The target torque TR1 is set to the average engine torque when the target rotational speed of the engine 1 is set to TNE2, which is slightly lower than TNE1, in the fuel combustion control state.

The target rotational speed of the engine 1 in the motor/engine combined control state at times T4 to T5 is set to TNE2. The target torque of the engine 1 is calculated by feedback control of the rotational speed, but the magnitude of the torque that is actually output differs depending on the state of the engine 1, and therefore it is necessary to set the target torque of the motor 9 in accordance with the predicted output torque of the engine 1.

At time t=T5, the target torque of the motor 9 is determined to have satisfied the determination condition for transfer from the motor/engine combined control state to the fuel combustion control state (called "transfer determination condition" below). The transfer determination condition is, for instance, that the conditions (A) and (B) below or conditions (A) and (C) are satisfied.

(A) The engine rotational angle after the injection of fuel is equal to or greater than a predetermined value.

(B) The ratio of the target torque of the motor 9 to the torque sum value obtained by adding the target torque of the engine 1 and the target torque of the motor 9 is less than a predetermined ratio threshold value.

(C) The target torque instructed to the motor 9 is lower than a predetermined torque threshold value.

Consequently, the restart control mode is set to the fuel combustion control state, by the engine start control device 4. The target torque of the motor 9 becomes zero and the motor 9 stops driving. The engine 1 continues rotational speed feedback control taking the target rotational speed as TNE2.

Next, an operation when starting using a start control method for the engine 1 according to the second example will be described using FIG. 3. FIG. 3 is a timing chart indicating the operations of the respective parts of the engine start control device in FIG. 1. In FIG. 3, the horizontal axis represents the time and the lateral axis represents changes in the respective factors. The factors include: the brake pedal, fuel injection, engine rotational speed, torque, rotational speed differential, rotational speed differential after low-pass filter, rotational speed differential after high-pass filter, engine rotational angle and restart control mode. The operation in the second example is virtually the same as the operation in the first example described above, and therefore only the portions which are different are described below. In the second example, rotational speed feedback control is carried out using the low-pass filter 43 and the high-pass filter 44 in the engine start control device 4 shown in FIG. 1B.

In FIG. 3, time t=T4 represents a timing at which the cylinder into which fuel has been injected at time t=T3 enters the expansion phase and the engine 1 generates torque. In this case, the restart control mode is set to the motor/engine combined control state, by the engine start control device 4. In the second example, the differential between the target rotational speed of the engine 1 and the actual rotational speed (called, "rotational speed differential" below) is calculated, and the rotational speed differential is subjected to filtering by the low-pass filter 43 and high-pass filter 44. Here, the rotational speed differential that has been filtered by the high-pass filter 44 is called "rotational speed differential after high-pass filter", and the rotational speed differential that has been filtered by the low-pass filter 43 is called "rotational speed differential after low-pass filter". The target torque of the motor 9 is determined by feedback control on the basis of the rotational speed differential after high-pass filter. On the other hand, the target torque of the engine 1 is determined by feedback control on the basis of the rotational speed differential after low-pass filter. Moreover, the cut-off frequencies of the filters 43, 44 are each set previously in the engine start control device 4, and this value is changed by the engine rotational speed.

Next, an operation when starting using a start control method for the engine 1 according to the third example will be described using FIG. 4. FIG. 4 is a timing chart indicating the operations of the respective parts of the engine start control device in FIG. 1. In FIG. 4, the horizontal axis represents the time and the lateral axis represents changes in the respective factors. The factors include: the brake pedal, fuel injection, engine rotational speed, torque, engine rotational angle, torque division coefficient, and restart control mode. The operation in the third example is virtually the same as the operation in the first example described above, and therefore only the portions which are different are described below.

Time t=T4 represents a timing at which the cylinder into which fuel has been injected at time t=T3 enters the expansion phase and the engine 1 generates torque. In this case, the restart control mode is set to the motor/engine combined control state, by the engine start control device 4. The target torque of motor 9 and the target torque of engine 1 are determined by feedback control on the basis of the difference between the target rotational speed of the engine 1 and the actual rotational speed thereof. The target torque obtained as a result of the feedback control is divided into the target torque of the motor 9 and a target torque of the engine 1, by a predetermined torque division coefficient. The torque division coefficient indicates a distribution ratio when the target torque is allocated to the motor 9 and the engine 1. When the torque division coefficient is 100%, the target torque is divided at a ratio of 100% to the motor 9 and 0% to the engine 1. Similarly, when the torque division coefficient is 80%, the target torque is divided at a ratio of 80% to the motor 9 and 20% to the engine 1. The torque division coefficient is previously determined in the engine start control device 4, and the value thereof is 100% when in the motoring control state, but as the cylinder thereafter switches successively from the cylinder where combustion occurs first in the engine 1 to the cylinder where combustion occurs next, the torque division coefficient is set so as to decrease in steps, at a predetermined rate, from 100%. Therefore, the torque division coefficient progressively decreases in steps, in predetermined decrements (called "second decrements" below).

As described above, in each of the first example, second example and third example, when the restart control mode of the engine 1 is transferred from the motoring control state to the fuel combustion control state, the control unit 40 executes this transfer via the motor/engine combined control state. Furthermore, the timing of transferring from the motoring control state to the motor/engine combined control state is the timing at which the crank angle of the cylinder where the fuel is combusted first after starting fuel injection reaches the crank angle at which it is estimated that torque is generated by the first combustion of fuel in that cylinder. Consequently, since the torque of the motor 9 can be decreased in accordance with the timing at which the initial explosion occurs, it is possible to control the torque applied to the whole vehicle, with good response, compared to a case where the torque of the motor 9 is controlled after detecting the generation of torque by the engine 1, and consequently, racing of the engine revolutions can be suppressed.

Figure 5A:
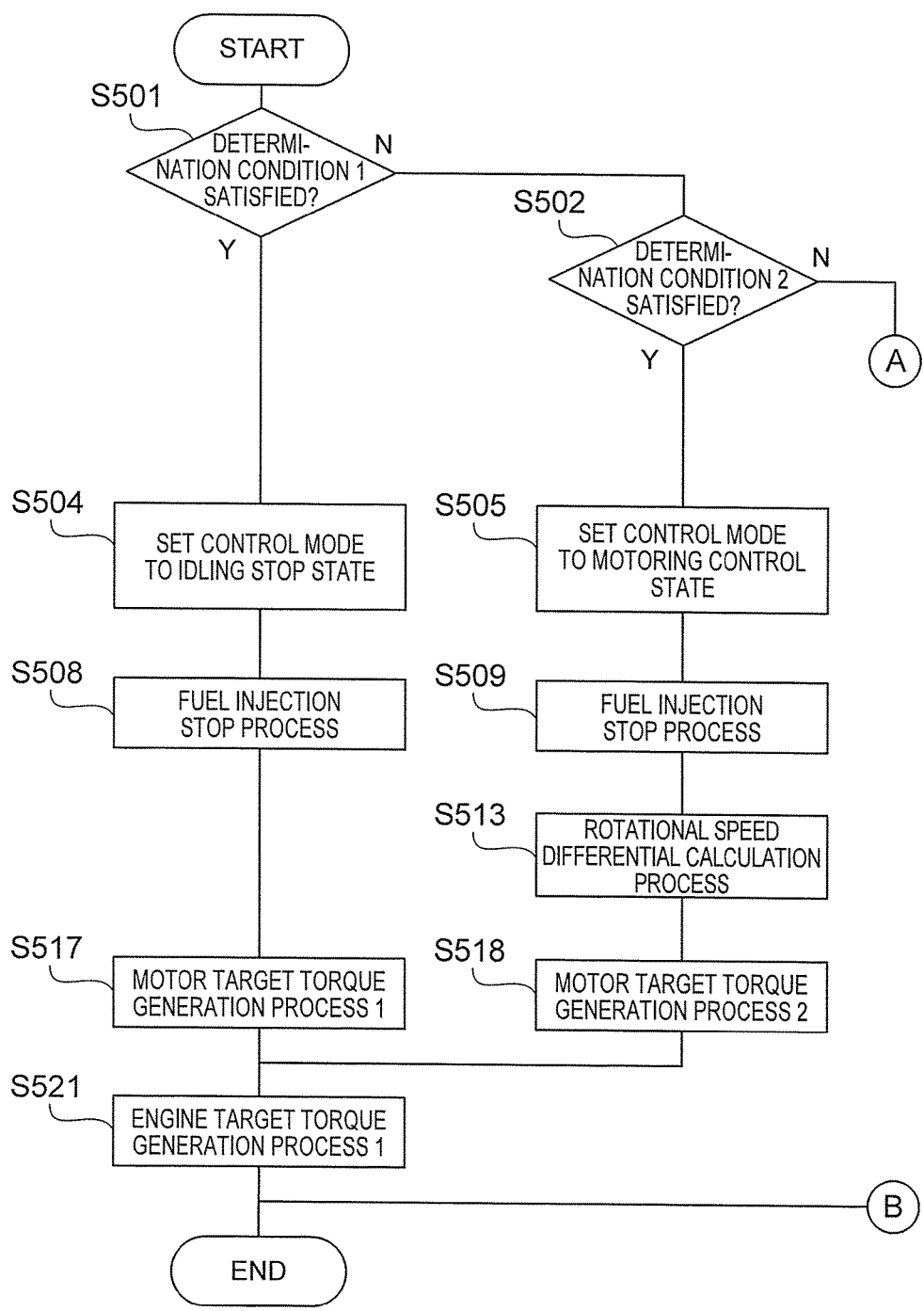
FIG. 5A is a flowchart illustrating the engine start control device according to the first embodiment of the invention.
Figure 5B:
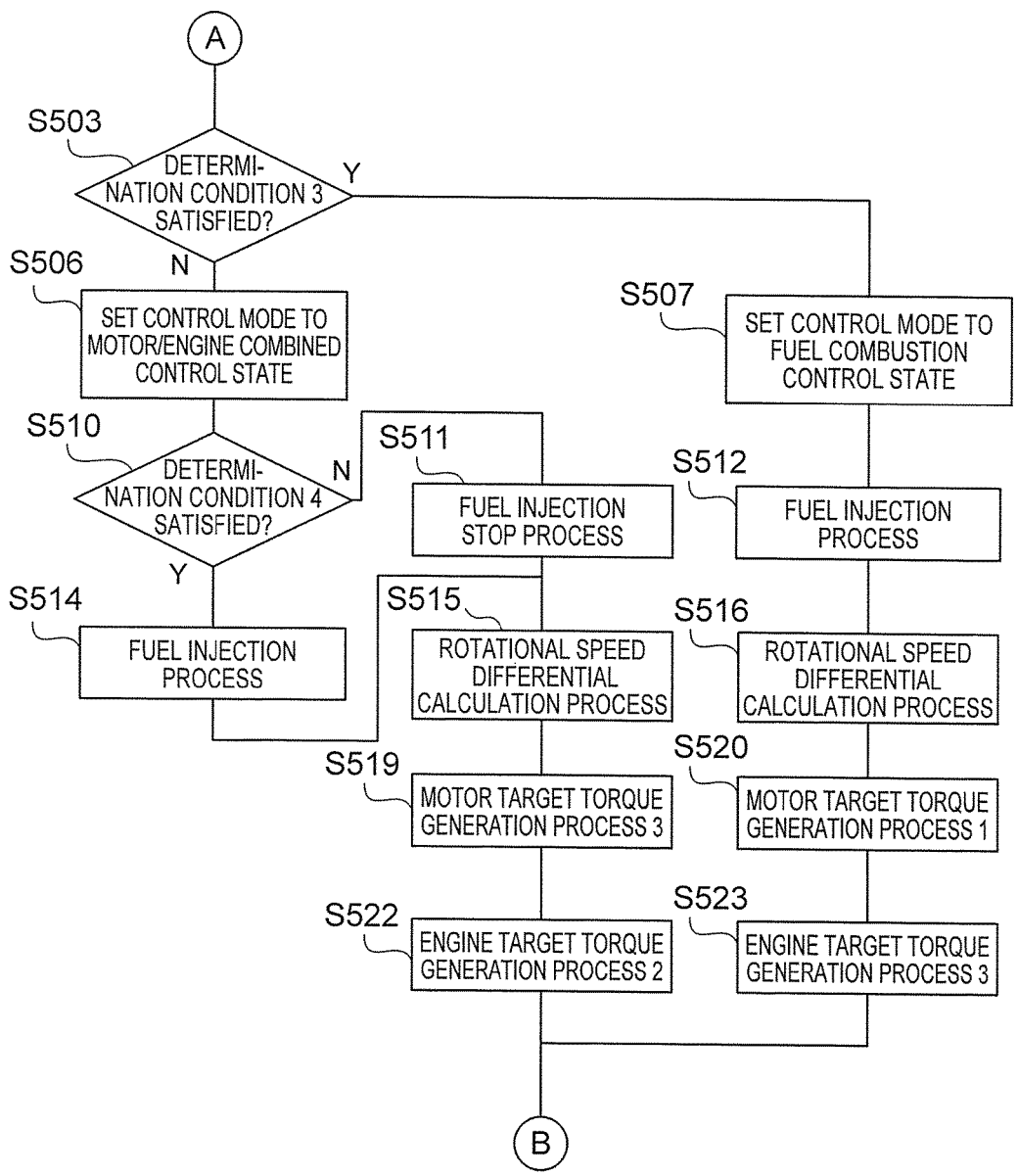
FIG. 5B is a flowchart illustrating the engine start control device according to the first embodiment of the invention.

Next, the operation of the engine start control device 4 in the operations in the timing charts in FIG. 2 to FIG. 4 is described with reference to the flowcharts. The whole process is described here with reference to the flowchart in FIG. 5. FIG. 5 is described separately as two drawings: FIG. 5A and FIG. 5B. The processes in the steps from step S501 to step S523 in FIG. 5A and FIG. 5B are carried out by the control unit 40 in the engine start control device 4 illustrated in FIG. 1B.

Furthermore, the rotational speed differential calculation processes in steps S513, S515, S516 in FIG. 5A and FIG. 5B are described in detail with reference to the flowchart in FIG. 6. Moreover, the motor target torque generation process 1 in steps S517 and S520 is described in FIG. 7, and the motor target torque generation process 2 in step S518 is described in FIG. 8. The motor target torque generation process 3 in step S519 which involves a different operation to the first to third examples is described in detail with reference to FIG. 9A to FIG. 9C.

Figure 10:
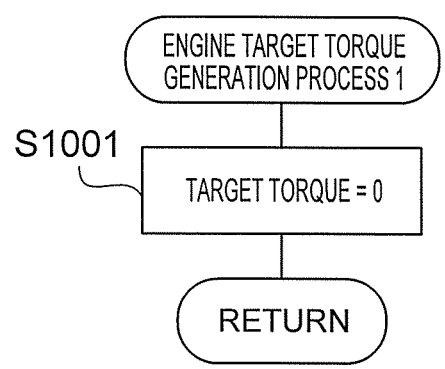
FIG. 10 is an operation flowchart of an engine target torque generation process 1 in FIG. 5A and FIG. 5B of this invention.
Figure 11A:
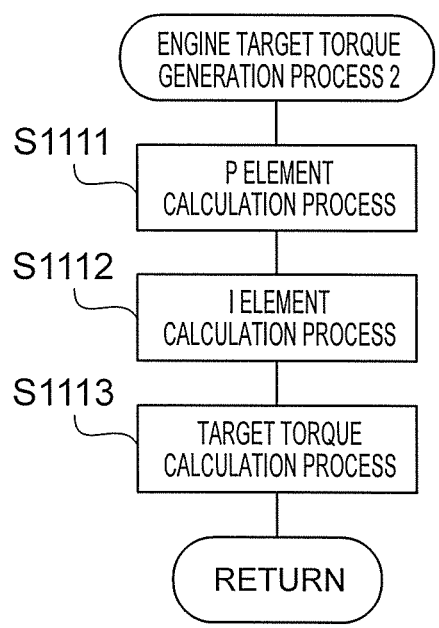
FIG. 11A is an operation flowchart of an engine target torque generation process 2 according to the first example in FIG. 5A and FIG. 5B of this invention.
Figure 11B:
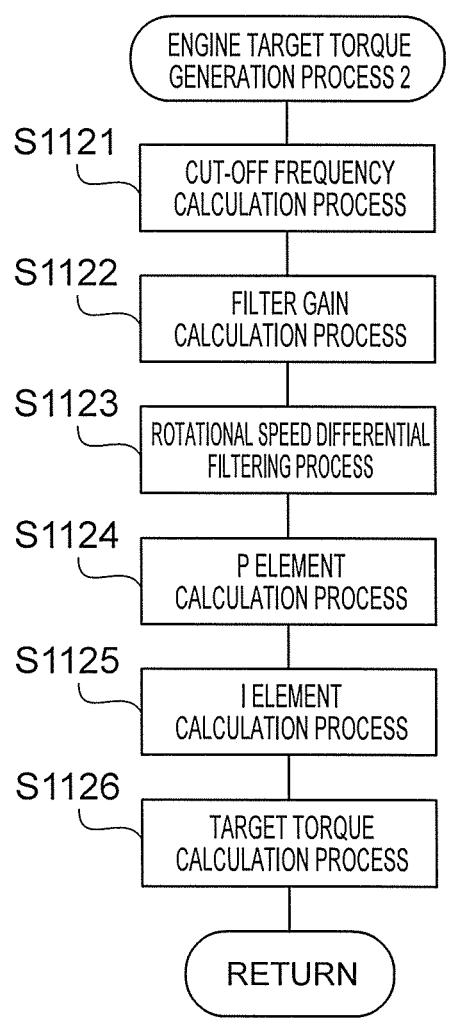
FIG. 11B is an operation flowchart of an engine target torque generation process 2 according to the second example in FIG. 5A and FIG. 5B of this invention.
Figure 11C:
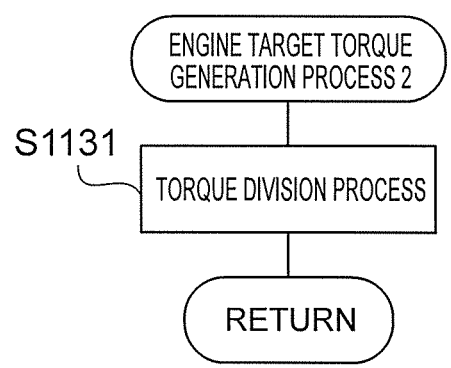
FIG. 11C is an operation flowchart of an engine target torque generation process 2 according to the third example in FIG. 5A and FIG. 5B of this invention.
Figure 12:
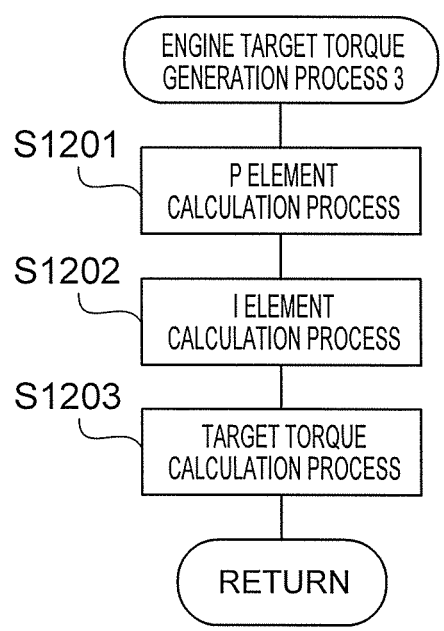
FIG. 12 is an operation flowchart of an engine target torque generation process 3 in FIG. 5A and FIG. 5B of this invention.

Moreover, the engine target torque generation process 1 in step S521 is described in FIG. 10, and the engine target torque generation process 3 in step S523 is described in FIG. 12. The engine target torque generation process 2 in step S522 which involves a different operation to the first to third examples is described in detail with reference to FIG. 11A to FIG. 11C.

FIG. 5A and FIG. 5B are flowcharts showing the operation of the engine start control device 4 in the operation illustrated in the timing charts in FIG. 2 to FIG. 4. This routine is repeated during travel of the vehicle.

As shown in FIG. 5A and FIG. 5B, firstly, in step S501, the control unit 40 determines whether or not a determination condition 1 has been satisfied. The determination condition 1 is a predetermined "idling stop condition". If the condition is satisfied, the procedure advances to step S504, and if the condition is not satisfied, the procedure advances to step S502. One example of the "idling stop condition" is when the vehicle speed is less than 5 km/h, and the brake depression amount is equal to or greater than a predetermined depression amount.

In step S502, the control unit 40 determines whether or not a determination condition 2 has been satisfied. The determination condition 2 is a predetermined "restart condition". If the condition is satisfied, the procedure advances to step S505, and if the condition is not satisfied, the procedure advances to step S503. An example of the determination condition 2 is when the brake depression amount is less than a predetermined fixed amount.

In step S503, the control unit 40 determines whether or not a determination condition 3 has been satisfied. The determination condition 3 is a predetermined "transfer determination condition". If the condition is satisfied, the procedure advances to step S507, and if the condition is not satisfied, the procedure advances to step S506. One example of the determination condition 3 is when the conditions A and B or A and C below are satisfied.

(A) The engine rotational angle after the injection of fuel is equal to or greater than a predetermined angle.

(B) Target torque of the motor 9/(target torque of engine 1+target torque of motor 9)<(predetermined ratio threshold value)

(C) Target torque of motor 9<(predetermined torque threshold value)

In step S504, the control unit 40 sets the restart control mode to an idling stop state and then advances to step S508.

In step S505, the control unit 40 sets the restart control mode to a motoring control state and then advances to step S509.

In step S506, the control unit 40 sets the restart control mode to a motor/engine combined control state and then advances to step S510.

In step S507, the control unit 40 sets the restart control mode to a fuel combustion control state and then advances to step S512.

In step S508, the control unit 40 sets the injector 11 to a non-drive state so as to stop fuel injection, and then advances to step S517.

In step S509, the control unit 40 sets the injector 11 to a non-drive state so as to stop fuel injection, and then advances to step S513.

In step S510, it is determined whether or not a determination condition 4 has been satisfied. The determination condition 4 is a predetermined "fuel injection restart condition". If the condition is satisfied, the procedure advances to step S514, and if the condition is not satisfied, the procedure advances to step S511. One example of the determination condition 4 is when a predetermined time has elapsed after release of the brake pedal.

In step S511, the control unit 40 sets the injector 11 to a non-drive state so as to stop fuel injection, and then advances to step S515.

In step S512, the control unit 40 sets the injector 11 to a drive state so as to execute fuel injection, and then advances to step S516.

In step S513, the control unit 40 executes a rotational speed differential calculation process and then advances to step S518.

In step S514, the control unit 40 sets the injector 11 to a drive state so as to execute fuel injection, and then advances to step S515.

In step S515, the control unit 40 executes a rotational speed differential calculation process and then advances to step S519.

In step S516, the control unit 40 executes a rotational speed differential calculation process and then advances to step S520.

In step S517, the control unit 40 executes the motor target torque generation process 1 and then advances to step S521.

In step S518, the control unit 40 executes the motor target torque generation process 2 and then advances to step S521.

In step S519, the control unit 40 executes the motor target torque generation process 3 and then advances to step S522.

In step S520, the control unit 40 executes the motor target torque generation process 1 and then advances to step S523.

In step S521, the control unit 40 executes the engine target torque generation process 1 and then terminates the subroutine.

In step S522, the control unit 40 executes the engine target torque generation process 2 and then terminates the subroutine.

In step S523, the control unit 40 executes the engine target torque generation process 3 and then terminates the subroutine.

Next, the rotational speed differential calculation processes in steps S513, S515, S516 in FIG. 5A and FIG. 5B are described in detail with reference to the flowchart in FIG. 6.

In step S601, the control unit 40 calculates the rotational speed of the engine 1 by differentiating the rotational angle of the engine 1 detected by the rotational angle detector 8, and then advances to step S602.

In step S602, the control unit 40 calculates a target rotational speed and then advances to step S603. The target rotational speed is determined by the following formula.

$$\text{Target rotational speed} = \text{MIN}(\text{predetermined target engine rotational speed increment [r/min/sec]} \times \text{elapsed time after release of brake, maximum value of target rotational speed})$$

Here, the maximum value of the target rotational speed is determined by conditions (1) and (2) below.

(1) When in a motoring control state: TNE1
(2) When condition A is not satisfied: TNE2

The target engine rotational speed increment is stored previously in the control unit 40. Furthermore, the operator MIN (,) represents an operation of determining the smallest of the values in the brackets.

In step S603, the control unit 40, using the formula below, calculates the rotational speed differential between the rotational speed of the engine 1 determined in step S601 and the target rotational speed determined in step S602, and then terminates the subroutine.

Rotational speed differential=target rotational speed−rotational speed of engine 1

Figure 7:
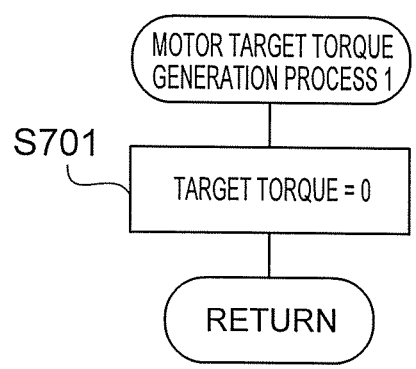
FIG. 7 is an operation flowchart of a motor target torque generation process 1 in FIG. 5A and FIG. 5B of this invention.

Next, the motor target torque generation process 1 in steps S517, S520 in FIG. 5A and FIG. 5B is described with reference to the flowchart in FIG. 7.

In step S701, the control unit 40 sets the motor target torque to zero and also instructs the motor control unit 42 to operate the motor 9 at this motor target torque, and then terminates the subroutine.

Figure 8:
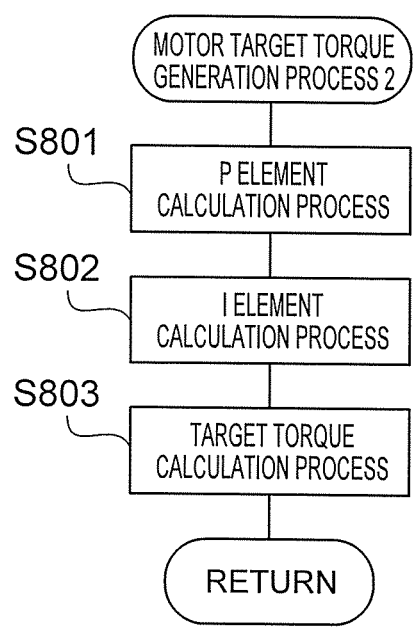
FIG. 8 is an operation flowchart of a motor target torque generation process 2 in FIG. 5A and FIG. 5B of this invention.

Next, the motor target torque generation process 2 in step S518 in FIG. 5A and FIG. 5B is described with reference to the flowchart in FIG. 8.

In step S801, the control unit 40 executes a P element calculation process and then advances to step S802. The P element is determined by the following formula. Here, the P element gain is previously stored inside the control unit 40.

P element=rotational speed differential×P element gain

In step S802, the control unit 40 executes an I element calculation process and then advances to step S803. The I element is calculated by the following formula. Here, the I element gain is previously stored inside the control unit 40.

I element(current value)=rotational speed differential×I element gain+I element(previous value)

In step S803, the control unit 40 calculates the motor target torque and also instructs the motor control unit 42 to operate the motor 9 at this motor target torque, and then terminates the subroutine. The motor target torque is determined by the following formula.

Motor target torque=P element+I element

Figure 9A:
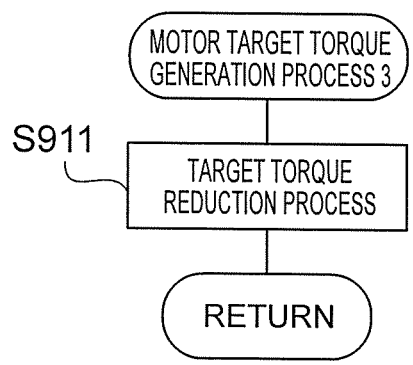
FIG. 9A is an operation flowchart of a motor target torque generation process 3 according to a first example in FIG. 5A and FIG. 5B of this invention.
Figure 9B:
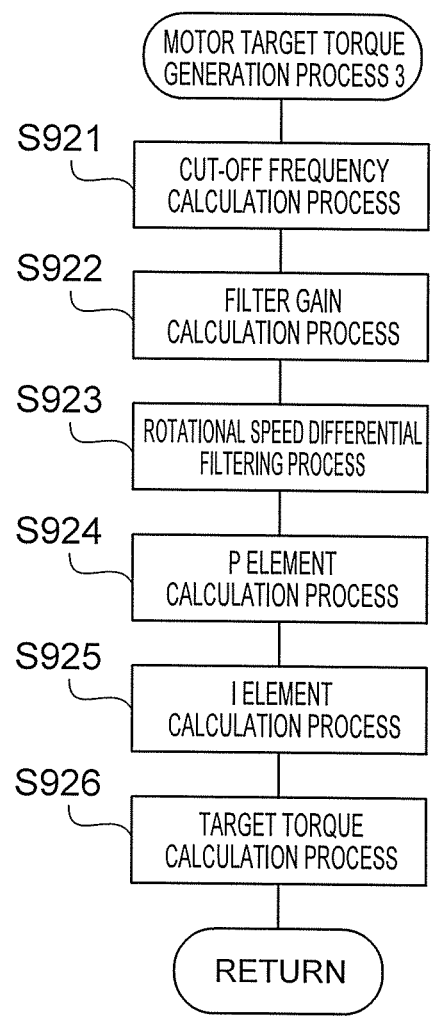
FIG. 9B is an operation flowchart of a motor target torque generation process 3 according to a second example in FIG. 5A and FIG. 5B of this invention.
Figure 9C:
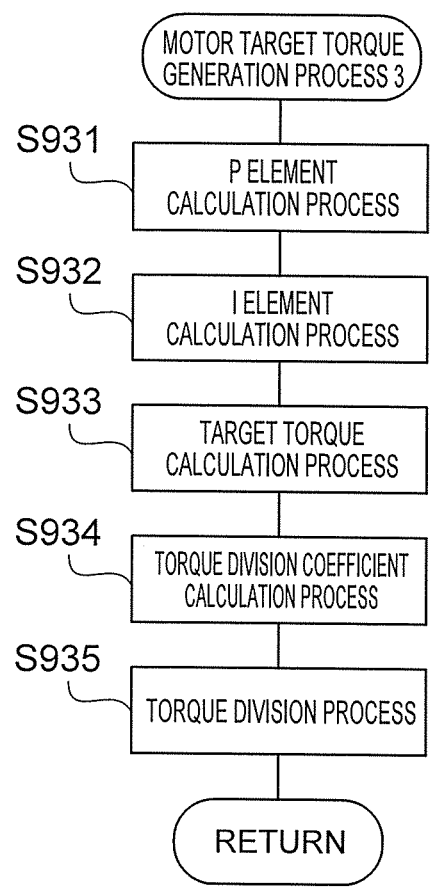
FIG. 9C is an operation flowchart of a motor target torque generation process 3 according to a third example in FIG. 5A and FIG. 5B of this invention.

Next, the motor target torque generation process 3 in step S519 in FIG. 5A and FIG. 5B is described with reference to the flowchart in FIG. 9A to FIG. 9C. FIG. 9A illustrates the motor target torque generation process 3 according to the first example. FIG. 9B illustrates the motor target torque generation process 3 according to the second example. FIG. 9C illustrates the motor target torque generation process 3 according to the third example.

Firstly, the motor target torque generation process 3 of the first example illustrated in FIG. 9A is described.

In step S911, the control unit 40 calculates the motor target torque and also instructs the motor control unit 42 to operate the motor 9 at this motor target torque, and then terminates the subroutine. The motor target torque is determined by a map using, as an input, the rotational angle after the start of the motor/engine combined control state. This map is a look-up table in which the rotational angle of the engine 1 and the motor target torque are previously stored in associated fashion. Consequently, when the rotational angle of the engine 1 is input to the map as an input parameter, the motor target torque corresponding to that rotational angle is output as an output parameter.

Next, the motor target torque generation process 3 of the second example illustrated in FIG. 9B is described.

In step S921, the control unit 40 calculates a cut-off frequency and then advances to step S922. The cut-off frequency is determined by a map using, as an input, the current rotational angle of the engine 1. This map is a look-up table in which the rotational angle of the engine 1 and the cut-off frequency are previously stored in associated fashion. Consequently, when the rotational speed of the engine 1 is input to the map as an input parameter, the cut-off frequency corresponding to that rotational speed is output as an output parameter. Therefore, the cut-off frequency is switched in accordance with the current rotational speed of the engine 1.

In step S922, the control unit 40 calculates a high-pass filter gain and then advances to step S923. The high-pass filter gain is determined by a map using, as an input, the rotational speed of the engine 1. This map is a look-up table in which the value of the rotational speed of the engine 1 and the value of the high-pass filter gain are previously stored in associated fashion, and when the rotational speed of the engine 1 is input as an input parameter, a high-pass filter gain value corresponding thereto is output as an output parameter. Furthermore, in a further method, the high-pass filter gain may be determined by a predetermined calculation formula, on the basis of the cut-off frequency determined in step S921.

Figure 6:
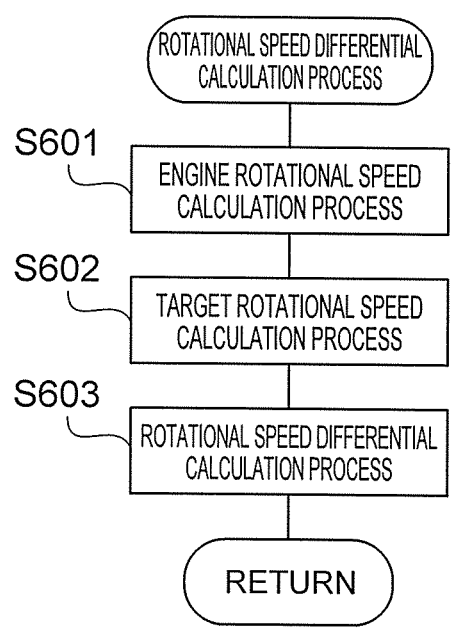
FIG. 6 is an operation flowchart of a rotational speed differential calculation process in FIG. 5A and FIG. 5B of this invention.

In step S923, the control unit 40 determines the rotational speed differential after high-pass filter, by applying the high-pass filter 44 to the rotational speed differential determined by the flowchart in FIG. 6. After this calculation, the procedure advances to step S924. The filtering by the high-pass filter 44 may be carried out by using a high-pass filter 44 in actual practice, but may also be determined by using the following formula, from the rotational speed differential after low-pass filter. In this case, the high-pass filter 44 shown in FIG. 1B is not necessary.

Rotational speed differential after high-pass filter=rotational speed differential−rotational speed differential after low-pass filter Rotational speed differential after low-pass filter(current value)={high-pass filter gain×rotational speed differential+(1−high-pass filter gain)×rotational speed differential after low-pass filter (previous value)}

In step S924, the control unit 40 executes a P element calculation process and then advances to step S925. The P element is determined by the following formula. Here, the P element gain is previously stored inside the engine start control device 4.

P element=rotational speed differential after application of high-pass filter×P element gain In step S925, the control unit 40 executes an I element calculation process and then advances to step S926. The I element is calculated by the following formula. Here, the I element gain is previously stored inside the engine start control device 4.

I element(current value)=rotational speed differential after application of high-pass filter×I element gain+I element(previous value)

In step S926, the control unit 40 calculates the motor target torque and also instructs the motor control unit 42 to operate the motor 9 at this motor target torque, and then terminates the subroutine. The motor target torque is determined by the following formula.

Motor target torque=P element+I element

Next, the motor target torque generation process 3 of the third example illustrated in FIG. 9C is described.

In step S931, the control unit 40 executes a P element calculation process and then advances to step S932. The P element is determined by the following formula. The P element gain is previously stored inside the engine start control device 4.

$$P \text{ element} = \text{rotational speed differential} \times P \text{ element gain}$$

In step S932, the control unit 40 executes an I element calculation process and then advances to step S933. The I element is calculated by the following formula. The I element gain is previously stored inside the engine start control device 4.

$$I \text{ element(current value)} = \text{rotational speed differential} \times I \text{ element gain} + I \text{ element(previous value)}$$

In step S933, the control unit 40 calculates the motor target torque and then advances to step S934. The motor target torque is determined by the following formula.

$$\text{Motor target torque} = P \text{ element} + I \text{ element}$$

In step S934, the control unit 40 calculates a torque division coefficient and then advances to step S935. The torque division coefficient is determined by a map using, as an input, the rotational angle after the start of the motor/engine combined control state. This map is a look-up table in which the value of the rotational angle and the value of the torque division coefficient are previously stored in associated fashion, and when the rotational angle is input as an input parameter, a torque division coefficient corresponding thereto is output as an output parameter.

In step S935, the control unit 40 corrects the motor target torque by multiplying the motor target torque determined in step S933 by the torque division coefficient determined in step S934, and instructs the motor control unit 42 to operate the motor 9 at the corrected motor target torque, and then terminates the subroutine. The corrected motor target torque is determined by the following formula.

$$\text{Corrected motor target torque} = \text{motor target torque} \times \text{torque division coefficient}$$

Next, the engine target torque generation process 1 in step S521 in FIG. 5A and FIG. 5B is described with reference to the flowchart in FIG. 10.

In step S1001, the control unit 40 sets the engine target torque to zero and also instructs the engine control unit 41 to operate the engine 1 at this engine target torque, and then terminates the subroutine.

Next, the engine target torque generation process 2 in step S522 in FIG. 5A and FIG. 5B is described with reference to the flowchart in FIG. 11A to FIG. 11C. FIG. 11A illustrates an engine target torque generation process 2 according to the first example. FIG. 11B illustrates an engine target torque generation process 3 according to the second example. FIG. 11C illustrates an engine target torque generation process 3 according to the third example.

Firstly, the engine target torque generation process 2 of the first example illustrated in FIG. 11A is described.

In step S1111, the control unit 40 executes a P element calculation process and then advances to step S1112. The P element is determined by the following formula. Here, the P element gain is previously stored inside the engine start control device 4.

$$P \text{ element} = \text{rotational speed differential} \times P \text{ element gain}$$

In step S1112, the control unit 40 executes an I element calculation process and then advances to step S1113. The I element is calculated by the following formula. Here, the I element gain is previously stored inside the engine start control device 4.

$$I \text{ element(current value)} = \text{rotational speed differential} \times I \text{ element gain} + I \text{ element(previous value)}$$

In step S1113, the control unit 40 calculates the engine target torque on the basis of the P element determined in step S1111 and the I element determined in step S1112. Furthermore, the control unit 40 instructs the engine control unit 41 to operate the engine 1 at this engine target torque, and then terminates the subroutine. The engine target torque is determined by the following formula.

$$\text{Engine target torque} = P \text{ element} + I \text{ element}$$

Next, the engine target torque generation process 3 of the second example illustrated in FIG. 11B is described.

In step S1121, the control unit 40 calculates a cut-off frequency and then advances to step S1122. The cut-off frequency is determined by the abovementioned map using, as an input, the rotational speed of the engine 1. This map is a look-up table in which the rotational angle of the engine 1 and the cut-off frequency are previously stored in associated fashion. Consequently, when the rotational speed of the engine 1 is input to the map as an input parameter, the cut-off frequency corresponding to that rotational speed is output as an output parameter.

In step S1122, the control unit 40 calculates a low-pass filter gain and then advances to step S1123. The low-pass filter gain is determined by the abovementioned map using, as an input, the rotational speed of the engine 1. This map is a look-up table in which the rotational angle of the engine 1 and the low-pass filter gain are previously stored in associated fashion. Consequently, when the rotational speed of the engine 1 is input to the map as an input parameter, the low-pass filter gain corresponding to that rotational speed is output as an output parameter. Alternatively, in a further method, it is also possible to determine the low-pass filter gain by a predetermined calculation formula, on the basis of the determined cut-off frequency.

In step S1123, the control unit 40 determines the rotational speed differential after low-pass filter by applying the low-pass filter to the rotational speed differential. After this calculation, the procedure advances to step S1124. The application of the low-pass filter uses the formula indicated below.

$$\text{Rotational speed differential after low-pass filter(current value)} = \{\text{low-pass filter gain} \times \text{rotational speed differential} + (1 - \text{low-pass filter gain}) \times \text{rotational speed differential after low-pass filter (previous value)}\}$$

In step S1124, the control unit 40 executes a P element calculation process and then advances to step S1125. The P element is determined by the following formula. Here, the P element gain is previously stored inside the engine start control device 4.

$$P \text{ element} = \text{rotational speed differential after low-pass filter} \times P \text{ element gain}$$

In step S1125, the control unit 40 executes an I element calculation process and then advances to step S1126. The I element is calculated by the following formula. Here, the I element gain is previously stored inside the engine start control device 4.

$$I \text{ element(current value)} = \text{rotational speed differential after low-pass filter} \times I \text{ element gain} + I \text{ element (previous value)}$$

In step S1126, the control unit 40 calculates the engine target torque and also instructs the engine control unit 41 to operate the engine 1 at this engine target torque, and then terminates the subroutine. The engine target torque is determined by the following formula.

Engine target torque=*P* element+*I* element

Next, the engine target torque generation process 3 of the third example illustrated in FIG. 11C is described.

In step S1131, the control unit 40 calculates the engine target torque by applying a torque division process using the torque division coefficient calculated in step S934 in FIG. 9C, to the motor target torque calculated in step S933 in FIG. 9C. Furthermore, the control unit 40 instructs the engine control unit 41 to operate the engine 1 at this engine target torque, and then terminates the subroutine. The engine target torque is determined by the following formula.

Engine target torque=(1−torque division coefficient)× motor target torque

Next, the engine target torque generation process 3 in step S523 in FIG. 5A and FIG. 5B is described with reference to the flowchart in FIG. 12.

In step S1201, the control unit 40 executes a P element calculation process and then advances to step S1202. The P element is determined by the following formula. Here, the P element gain is previously stored inside the engine start control device 4.

*P* element=rotational speed differential×*P* element gain

In step S1202, the control unit 40 executes an I element calculation process and then advances to step S1203. The I element is calculated by the following formula. Here, the I element gain is previously stored inside the engine start control device 4.

*I* element(current value)=rotational speed differential×*I* element gain+*I* element(previous value)

In step S1203, the control unit 40 calculates the engine target torque and also instructs the engine control unit 41 to operate the engine 1 at this engine target torque, and then terminates the subroutine. The engine target torque is determined by the following formula.

Engine target torque=*P* element+*I* element

In the description given above, in order to simplify the configuration, the filtering by the high-pass filter is performed by subtracting a low-pass filter involving a simple calculation from the rotational speed differential, but it is also possible to use another formula, provided that the effect of a high-pass filter is obtained.

In the description given above, in order to simplify the configuration, the filtering by the low-pass filter is performed by adding the rotational speed differential and the previous value of the rotational speed differential after low-pass filter at a predetermined ratio, but it is also possible to use another formula, provided that the effect of a low-pass filter is obtained.

The motor according to the present invention is explained mainly on a driving operation as a starting device, but the invention is not limited to this and the motor may also be a motor-generator, provided that the motor has a configuration capable of externally rotating an engine. Furthermore, the type of motor may be a general gear wheel-type starter motor, rather than a belt-type motor.

The target rotational speed according to the present invention is described as the target rotational speed of the engine, but as stated above, if the rotational speed ratio between the engine and the motor is known, then it is possible to calculate a target rotational speed of the engine as a target rotational speed of the motor, and therefore, the invention is not limited to the embodiments given above and can also adopt a configuration in which the target rotational speed is taken to be the target rotational speed of the motor.

The invention claimed is:

1. An engine start control device mounted in a vehicle, the vehicle having an engine, a motor which causes the engine to rotate, and tires which rotate due to motive power from at least one of the engine and the motor, the engine start control device comprising:
an engine control unit which controls the output of the engine by adjusting at least one of an intake air amount and a fuel injection amount of the engine;
a motor control unit which controls the output of the motor; and
a control unit which controls the engine control unit and the motor control unit,
wherein the control unit has, as restart control modes of the engine:
a motoring control state which causes the engine to rotate only by drive power of the motor;
a fuel combustion control state which causes the engine to rotate only by drive power from combustion of fuel in the engine; and
a motor/engine combined control state which causes the engine to rotate by both the drive power of the motor and the drive power from combustion of fuel in the engine, and
the control unit:
when transferring the restart control mode of the engine from the motoring control state to the fuel combustion control state, executes the transfer via the motor/engine combined control state; and
sets a timing of transferring from the motoring control state to the motor/engine combined control state, to a timing at which a crank angle of a cylinder where fuel is combusted first after starting injection of the fuel reaches a crank angle at which it is estimated that torque is generated by the first combustion of fuel in the cylinder.

2. The engine start control device according to claim 1, wherein the motor/engine combined control state is a control state including:
engine control in which the engine control unit performs rotational speed feedback control based on a predetermined target rotational speed and a current rotational speed; and
motor control in which the motor control unit controls the motor so as to progressively reduce motor torque by a predetermined torque reduction amount.

3. The engine start control device according to claim 1, wherein the motor/engine combined control state is a control state including:
engine control in which the engine control unit performs rotational speed feedback control based on a rotational speed differential between a target rotational speed and a current rotational speed of the engine; and
motor control in which the motor control unit performs rotational speed feedback control based on the rotational speed differential of the engine.

4. The engine start control device according to claim 3, wherein, in the motor/engine combined control state, the control unit calculates the rotational speed differential between the target rotational speed and the current rotational speed of the engine, applies a low-pass filter and a high-pass filter to the rotational speed differential, sets the rotational speed differential after the low-pass filter as the rotational speed differential for the rotational speed feedback control in the engine control unit, and sets the rotational speed differential after the high-pass filter as the rotational speed differential in the motor control unit.

5. The engine start control device according to claim 4, wherein the cut-off frequency of the low-pass filter and the cut-off frequency of the high-pass filter are switched on the basis of the current rotational speed of the engine.

6. The engine start control device according to claim 1, wherein the motor/engine combined control state is a rotational speed feedback control state based a rotational speed differential between a target rotational speed and a current rotational speed of the engine, and the control unit distributes target torque based on the rotational speed differential to the engine and the motor respectively at a predetermined ratio.

7. The engine start control device according to claim 6, wherein the predetermined ratio is previously determined such that the sum of the ratio for the engine and the ratio for the motor is 100%, and the ratio for the motor takes a maximum value immediately after transfer to the motor/engine combined control state, and subsequently decreases in steps at a predetermined rate, each time the cylinder where combustion of fuel occurs in the engine switches from one cylinder to the next cylinder.

8. The engine start control device according to claim 1, wherein, in the motor/engine combined control state, the control unit calculates, as estimated torque, torque required by the vehicle in the fuel combustion control state, and sets an initial value of a torque command value instructed to the motor immediately before transfer to the motor/engine combined control state to a value that is greater than the estimated torque.

9. The engine start control device according to claim 1, wherein the engine and the motor are configured so as to be capable of transmitting motive power mutually to the vehicle, and a constant rotational speed ratio relationship is established at all times between a rotational speed of the motor and a rotational speed of the engine.

10. The engine start control device according to claim 1, wherein a transfer determination condition for transferring from the motor/engine combined control state to the fuel combustion control state is that the ratio of target torque of the motor to a target torque sum value obtained by adding target torque of the engine and the target torque of the motor is less than a predetermined first threshold value.

11. The engine start control device according to claim 1, wherein a transfer determination condition for transferring from the motor/engine combined control state to the fuel combustion control state is that target torque of the motor is less than a predetermined second threshold value.

* * * * *